(12) United States Patent
Araki et al.

(10) Patent No.: US 11,502,632 B2
(45) Date of Patent: Nov. 15, 2022

(54) MOTOR CONTROL DEVICE AND ELECTRIC VEHICLE

(71) Applicant: HITACHI AUTOMOTIVE SYSTEMS, LTD., Ibaraki (JP)

(72) Inventors: Takahiro Araki, Tokyo (JP); Hideki Miyazaki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 61 days.

(21) Appl. No.: 16/982,635

(22) PCT Filed: Feb. 7, 2019

(86) PCT No.: PCT/JP2019/004341
§ 371 (c)(1),
(2) Date: Sep. 21, 2020

(87) PCT Pub. No.: WO2019/187678
PCT Pub. Date: Oct. 3, 2019

(65) Prior Publication Data
US 2021/0028735 A1  Jan. 28, 2021

(30) Foreign Application Priority Data
Mar. 28, 2018 (JP) .............................. JP2018-061838

(51) Int. Cl.
*H02P 21/00* (2016.01)
*H02P 21/22* (2016.01)
(Continued)

(52) U.S. Cl.
CPC ................ *H02P 21/22* (2016.02); *B60K 1/00* (2013.01); *B60L 15/20* (2013.01); *H02P 21/05* (2013.01); *H02P 27/12* (2013.01)

(58) Field of Classification Search
CPC .......... H02P 21/22; H02P 21/05; H02P 27/12; B60K 1/00
(Continued)

(56) References Cited

U.S. PATENT DOCUMENTS

2008/0067960 A1* 3/2008 Maeda ................... B62D 5/046
                                                      180/443
2012/0001574 A1* 1/2012 Akaishi .................. H02P 29/032
                                                    318/400.04
(Continued)

FOREIGN PATENT DOCUMENTS

JP  S61-150698 A   7/1986
JP  02-136096 A    5/1990
(Continued)

OTHER PUBLICATIONS

Japanese Office Action dated Sep. 21, 2021 for Japanese Patent Application No. 2018-061838.
(Continued)

*Primary Examiner* — Erick D Glass
(74) *Attorney, Agent, or Firm* — Volpe Koenig

(57) ABSTRACT

A motor can be controlled in a user-friendly manner so that a phase current based on an input command torque command value is caused to flow to at least one among U-phase, V-phase, and W-phase windings of the motor, so that a predetermined in-phase current is superimposed on the phase current and caused to flow to at least one among the windings. The motor is controlled such that energization to one winding corresponding to a predetermined energization stop phase is stopped, for example, so that energization to the U-phase winding is stopped, and so that a V-phase current, a W-phase current and an in-phase current are caused to flow to each winding corresponding to a phase other than the energization stop phase, for example, so that the V-phase current, the W-phase current and the in-phase (Continued)

current are caused to flow to the V-phase winding and the W-phase winding.

20 Claims, 11 Drawing Sheets

(51) Int. Cl.
  *B60K 1/00* (2006.01)
  *B60L 15/20* (2006.01)
  *H02P 21/05* (2006.01)
  *H02P 27/12* (2006.01)
(58) Field of Classification Search
  USPC .................................................... 318/400.02
  See application file for complete search history.

(56) References Cited

U.S. PATENT DOCUMENTS

| | | | |
|---|---|---|---|
| 2014/0152205 A1* | 6/2014 | Nakai | ................ H02P 21/22 318/400.02 |
| 2016/0373044 A1 | 12/2016 | Chi | |
| 2017/0133958 A1* | 5/2017 | Hoshino | ................ H02P 27/06 |
| 2017/0331395 A1 | 11/2017 | Kanazawa et al. | |
| 2017/0338756 A1 | 11/2017 | Jung | |
| 2019/0013761 A1* | 1/2019 | Seo | ................ H02P 27/08 |
| 2019/0047613 A1 | 2/2019 | Kano et al. | |
| 2020/0216113 A1* | 7/2020 | Nabeshi | ................ B62D 5/0463 |

FOREIGN PATENT DOCUMENTS

| | | |
|---|---|---|
| JP | 2017-208901 A | 11/2017 |
| WO | 2015/199104 A1 | 12/2015 |
| WO | 2016-098410 A1 | 6/2016 |
| WO | 2017-141593 A1 | 8/2017 |

OTHER PUBLICATIONS

PCT/JP2019/004341 International Search Report, dated May 21, 2019, 2 pgs.

* cited by examiner

MOTOR CONTROL DEVICE AND ELECTRIC VEHICLE

TECHNICAL FIELD

The present invention relates to a motor control device and an electric vehicle.

BACKGROUND ART

Desirably, a motor that is mounted on a hybrid car or an electric car can continue to be driven even when a part of the control system stops in order to ensure safety while the hybrid car or the electric car is running. In order to satisfy this requirement, conventionally considered was a motor in which the winding of each phase is caused to be independent, but there was a problem in that the output torque will deteriorate when the system is stopped.

PTL 1 below is known as the background art of this technical field. PTL 1 discloses a control method where a motor can be continuously driven even when a converter of any phase among three phases malfunctions by continuously driving an induction motor by causing the U-phase current to be zero and delaying the phase of the V-phase current by 30°, and advancing the phase of the W-phase current by 30°, when the U-phase converter malfunctions.

CITATION LIST

Patent Literature

PTL 1: Japanese Unexamined Patent Application Publication No. S61-150698

SUMMARY OF THE INVENTION

Problems to be Solved by the Invention

With the control method described in PTL 1, while the motor can be continuously driven when the converter of any phase among the three phases malfunctions and energization is stopped, there is a problem in that the maximum output torque will decrease to roughly one half of the output torque during normal times. Accordingly, it is not possible to control a motor which has mutually independent windings in a user-friendly manner.

Means to Solve the Problems

A motor control device according to the present invention is for controlling a motor which has a plurality of windings that are electrically independent from each other in correspondence with each of a plurality of phases, wherein the motor control device controls the motor so that a phase current based on an input command value is caused to flow to at least one of the plurality of windings, and a predetermined in-phase current is superimposed on the phase current and caused to flow to at least one of the plurality of windings.

An electric vehicle according to the present invention comprises a motor control device and the motor controlled by the motor control device.

Advantageous Effects of the Invention

According to the present invention, it is possible to control a motor which has mutually independent windings in a user-friendly manner.

DESCRIPTION OF EMBODIMENTS

Figure 1:
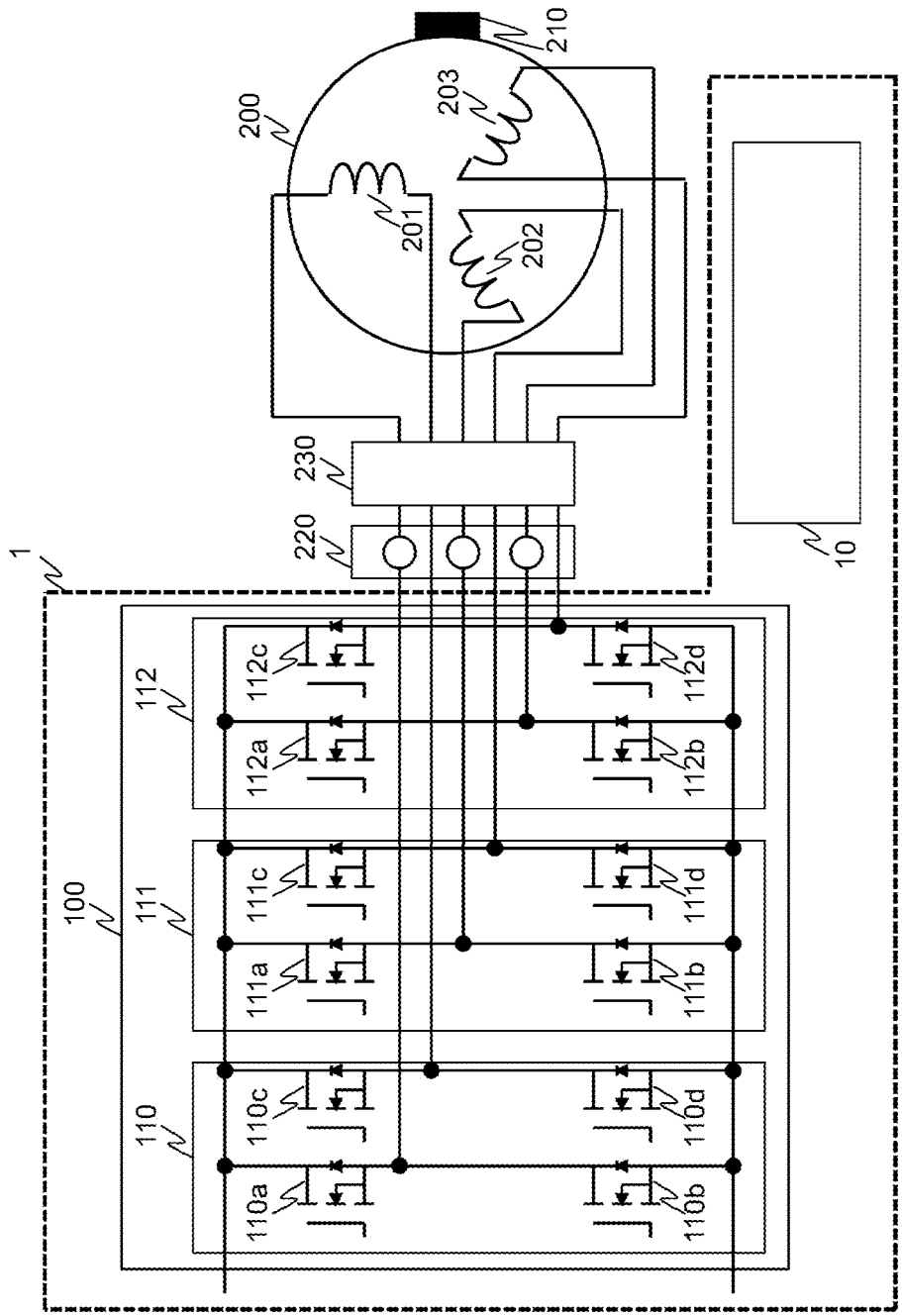
FIG. 1 is a diagram showing the configuration of the motor drive unit according to an embodiment of the present invention.

An embodiment of the present invention is now explained with reference to the appended drawings. However, the present invention should not be limitedly interpreted to the following embodiments, and the technical concept of the present invention may also be realized by combining other publicly known constituent elements. Note that the same constituent elements in the respective drawings are given the same reference numeral, and redundant explanations will be omitted.

FIG. 1 is a diagram showing the configuration of the motor drive unit according to an embodiment of the present invention. The motor drive unit 1 shown in FIG. 1 is connected to a motor 200, a position sensor 210, a current sensor 220 and a switch 230, and includes an inverter 100 and a motor control device 10. A case where the number of phases of the motor 200 is three phases is explained below.

The motor 200 includes a U-phase winding 201, a V-phase winding 202 and a W-phase winding 203 which are respectively wound around a stator of the motor 200. The respective windings are not mutually connected at a neutral point, and are respectively independent. The motor 200 is configured, for example, from an embedded-magnet type synchronous motor or the like.

The inverter 100 is configured from a U-phase full bridge inverter 110, a V-phase full bridge inverter 111, and a W-phase full bridge inverter 112. The U-phase winding 201 is connected to an output terminal of the U-phase full bridge inverter 110. The V-phase winding 202 is connected to an output terminal of the V-phase full bridge inverter 111. The W-phase winding 203 is connected to an output terminal of the W-phase full bridge inverter 112. As a result of the motor 200 not being connected to a neutral point, the motor 200 can independently control the current flowing to the U-phase winding 201, the current flowing to the V-phase winding 202, and the current flowing to the W-phase winding 203, respectively.

The position sensor 210 detects the position of a rotor of the motor 200, and outputs the detected rotor position θ to the motor control device 10.

The current sensor 220 detects phase currents iu, iv, iw which respectively flow to the U-phase winding 201, the V-phase winding 202 and the W-phase winding 203 of the motor 200, and outputs the detected phase currents iu, iv, iw to the motor control device 10. Note that, in the following explanation, the respective phase currents iu, iv, iw detected by the current sensor 220 are also hereinafter collectively referred to as the three-phase currents iu, iv, iw as appropriate.

In the inverter 100, the U-phase full bridge inverter 110, the V-phase full bridge inverter 111, and the W-phase full bridge inverter 112 are respectively connected in parallel to a DC power source (not shown) which is connected to the inverter 100.

The U-phase full bridge inverter 110 is configured from four switching elements 110a to 110d. The switching element 110a is placed on a U-phase left leg upper arm. The switching element 110b is placed on a U-phase left leg lower arm. The switching element 110c is placed on a U-phase right leg upper arm. The switching element 110d is placed on a U-phase right leg lower arm.

The V-phase full bridge inverter 111 is configured from four switching elements 111a to 111d. The switching element 111a is placed on a V-phase left leg upper arm. The switching element 111b is placed on a V-phase left leg lower arm. The switching element 111c is placed on a V-phase right leg upper arm. The switching element 111d is placed on a V-phase right leg lower arm.

The W-phase full bridge inverter 112 is configured from four switching elements 112a to 112d. The switching element 112a is placed on a W-phase left leg upper arm. The switching element 112b is placed on a W-phase left leg lower arm. The switching element 112c is placed on a W-phase right leg upper arm. The switching element 112d is placed on a W-phase right leg lower arm.

The motor drive unit 1 of FIG. 1 turns ON or turns OFF the switching elements 110a to 110d, the switching elements 111a to 111d, and the switching elements 112a to 112d respectively based on the switching signals generated by the motor control device 10. The inverter 100 thereby converts the DC voltage, which was applied from the DC power source (not shown), into an AC voltage. The AC voltage converted with the inverter 100 is applied to the each of the three-phase windings; that is, the U-phase winding 201, the V-phase winding 202 and the W-phase winding 203, wound around the stator of the motor 200, to generate a three-phase AC current. As a result of the three-phase AC current flowing to the motor 200, a rotating magnetic field is generated in the motor 200, and the rotor of the motor 200 is thereby rotated.

The switching elements 110a to 110d, the switching elements 111a to 111d, and the switching elements 112a to 112d are configured by being combined with a metal-oxide-semiconductor field-effect transistor (MOSFET) or an insulated gate bipolar transistor (IGBT), and a diode. While a configuration which uses a MOSFET and a diode is explained in this embodiment, the same applies to other configurations.

The motor control device 10 PWM-controls the inverter 100 based on an external torque command T*, the three-phase currents iu, iv, iw detected by the current sensor 220, and the rotor position θ detected by the position sensor 210. Moreover, the motor control device 10 controls the ON/OFF of the switch 230 based on an energization stop command which is given from a higher-level control device. In other words, by turning ON the switch 230, the inverter 100 and the respective windings 201 to 203 of the motor 200 are connected. Moreover, the inverter 100 and the respective windings 201 to 203 of the motor 200 are disconnected by turning OFF the switch 230.

As described above, by generating the switching signals and respectively outputting the generated switching signals to the switching elements 110a to 110d, 111a to 111d, and 112a to 112d, the motor control device 10 can PWM-control the inverter 100 and thereby control the motor 200. Various methods may be adopted for the generation of the switching signals by the motor control device 10. In the following explanation, an example of the generation method of the switching signals by the motor control device 10 is explained as the first embodiment of the present invention.

First Embodiment

Figure 2:
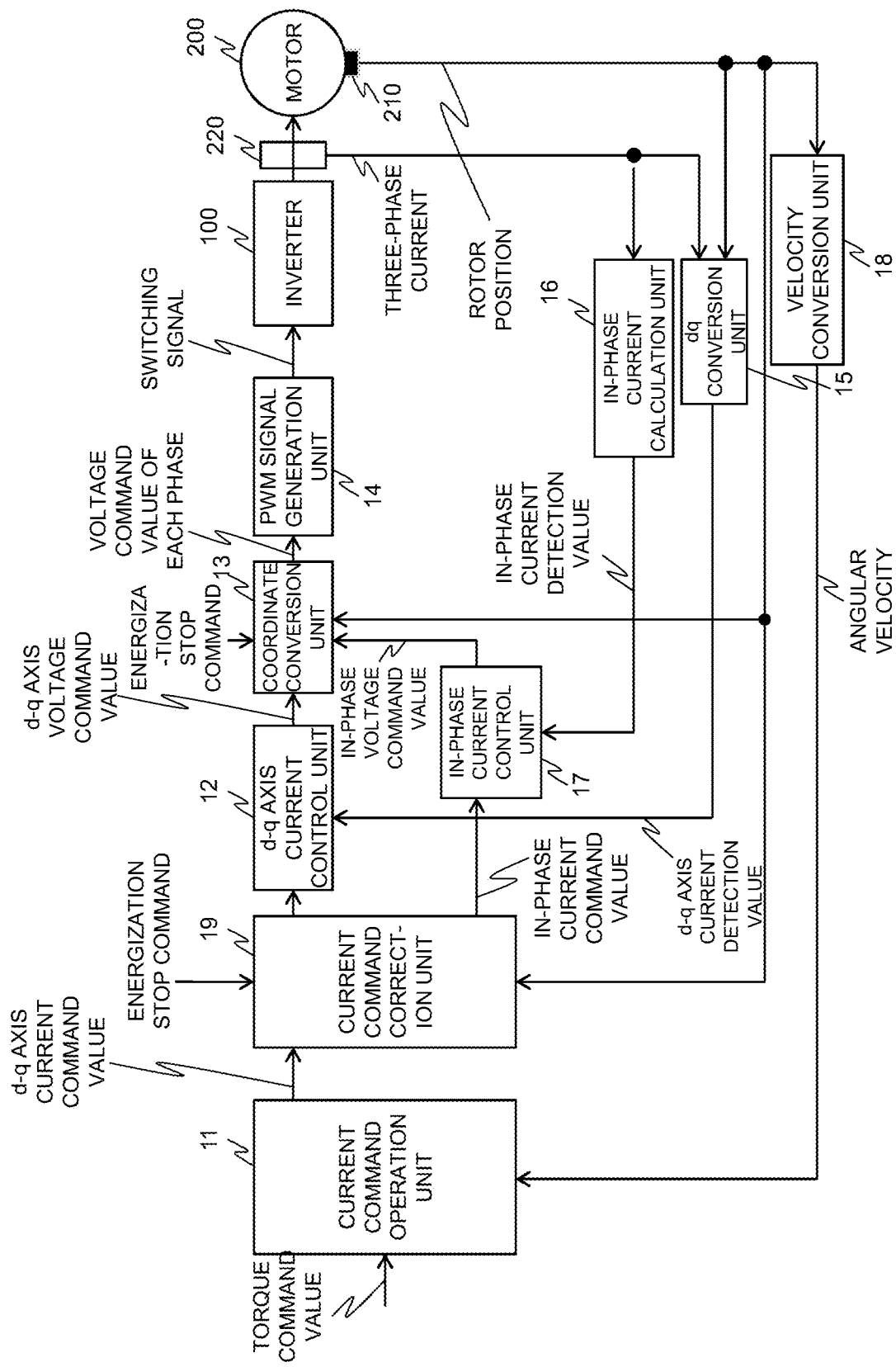
FIG. 2 is a functional block diagram of the motor drive unit according to the first embodiment of the present invention.

FIG. 2 is a functional block diagram of the motor control device 10 according to the first embodiment of the present invention. The motor control device 10 according to the first embodiment of the present invention is connected to the inverter 100 and the current sensor 220, and the position sensor 210 mounted on the motor 200, and comprises the respective functional blocks of a current command operation unit 11, a d-q axis current control unit 12, a coordinate conversion unit 13, a PWM signal generation unit 14, a dq conversion unit 15, an in-phase current calculation unit 16, an in-phase current control unit 17, a velocity conversion unit 18, and a current command correction unit 19. These functional blocks in the motor control device 10 area realized, for example, by a microcomputer executing predetermined programs. Otherwise, these functional blocks may also be realized with hardware such as an FPGA (Field-Programmable Gate Array). Note that, while the inverter 100, the motor 200, the position sensor 210 and the current sensor 220 are not included in the configuration of the motor control device 10, in FIG. 2 the inverter 100, the motor 200, the position sensor 210 and the current sensor 220 are included to illustrate, in an easy-to-understand manner, the information that is transferred between these components and the respective functional blocks of the motor control device 10.

The current command operation unit 11 operates a d-axis current command value id* and a q-axis current command value iq* (these values are hereinafter collectively referred to as the "d-q axis current command values id*, iq*"), which respectively correspond to a d-axis and a q-axis of the motor 200, based on a torque command value T* input to the motor control device 10 from the outside, and an angular velocity ω of the motor 200 output from the velocity conversion unit 18 based on the rotor position θ of the motor 200 detected by the position sensor 210. The d-q axis current command values id*, iq* calculated by the current command operation unit 11 are input to the current command correction unit 19.

The d-q axis current command values id*, iq* are input to the current command correction unit 19 from the current command operation unit 11, and the rotor position θ of the motor 200 detected by the position sensor 210 is also input to the current command correction unit 19. When the energization stop command of the motor 200 is input to the motor control device 10 from the outside, the current command correction unit 19 operates an in-phase current command value iz* to the in-phase current of the motor 200 based on the d-q axis current command values id*, iq* and the rotor position θ, and outputs the operated in-phase current command value iz* to the in-phase current control unit 17. Note that an in-phase current corresponds to a current obtained by synthesizing the phase currents flowing respectively to the U-phase winding 201, the V-phase winding 202 and the W-phase winding 203 of the motor 200, and is also referred to as a zero phase current. While the value of the in-phase current will be zero when the inverter 100 and the motor 200 are normal, the in-phase current will be a value other than 0 when the energization of any phase is stopped due to an abnormality of the inverter 100 or the motor 200. Thus, when the foregoing energization stop command has been input, the current command correction unit 19 operates the in-phase current command value iz* according to the in-phase current as a current corresponding to the current command of the energization stop phase, and outputs the operated in-phase current command value iz* to the in-phase current control unit 17. Details of the operation method of the in-phase current command value iz* by the current command correction unit 19 will be explained later.

The d-q axis current command values id*, iq* are input to the d-q axis current control unit 12 from the current command operation unit 11 via the current command correction 40 unit 19, and a d-axis current detection value id and a q-axis current detection value iq (these values are hereinafter collectively referred to as the "d-q axis current detection values id, iq"), which respectively correspond to the d-axis and the q-axis of the motor 200, are also input to the d-q axis current control unit 12 from the dq conversion unit 15. The d-q axis current control unit 12 operates, and outputs, a d-axis voltage command value vd* and a q-axis voltage command value vq* (these values are hereinafter collectively referred to as the "d-q axis voltage command values vd*, vq*") based on the input information by using known proportional control or integral control.

The in-phase current command value iz* is input to the in-phase current control unit 17 from the current command correction unit 19, and the in-phase current detection value iz is also input to the in-phase current control unit 17 from the in-phase current calculation unit 16. The in-phase current control unit 17 operates, and outputs, the in-phase voltage command value vz* based on the input information by using known proportional control or integral control.

Note that, if an energization stop command has not been input to the motor control device 10 from the outside, as described above, the current command correction unit 19 does not operate the in-phase current command value iz*. Thus, in the foregoing case, the in-phase current command value iz* to be input to the in-phase current control unit 17 becomes 0 and, since the in-phase current detection value iz is also 0, the in-phase voltage command value vz* output from the in-phase current control unit 17 becomes 0.

The d-q axis voltage command values vd*, vq* are input to the coordinate conversion unit 13 from the d-q axis current control unit 12, the in-phase voltage command value vz* is input to the coordinate conversion unit 13 from the in-phase current control unit 17, and a rotor position θ is input to the coordinate conversion unit 13 from the position sensor 210. The coordinate conversion unit 13 operates, and outputs, a U-phase voltage command value vu*, a V-phase voltage command value vv* and a W-phase voltage command value vw* (these values are hereinafter collectively referred to as the "UVW-phase voltage command values vu*, vv*, vw*") based on the input information by using rotational coordinate conversion. Here, the relational expression of the UVW-phase voltage command values vu*, vv*, vw*, and the d-q axis voltage command values vd*, vq* and the in-phase voltage command value vz*, is shown in Formula (1) below.

[Math 1]

$$\begin{bmatrix} V_d^* \\ V_q^* \\ V_z^* \end{bmatrix} = A \begin{bmatrix} \cos\theta & \sin\theta & 0 \\ -\sin\theta & \cos\theta & 0 \\ 0 & 0 & 1 \end{bmatrix} \begin{bmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{bmatrix} \begin{bmatrix} V_u^* \\ V_v^* \\ V_w^* \end{bmatrix} \quad (1)$$

The coordinate conversion unit 13 operates the UVW-phase voltage command values vu*, vv*, vw* based on Formula (1) above. A in Formula (1) above is a conversion coefficient. Moreover, if the energization stop command has not been input, as described above, the in-phase voltage command value vz* is 0.

When the energization stop command of the motor 200 has been input to the motor control device 10 from the outside, the coordinate conversion unit 13 stops the energization to the energization stop phase by setting the phase voltage command value of the energization stop phase, which is indicated by the energization stop command, to 0. For example, when the energization stop command, in which the U-phase is the energization stop phase, has been input, with the U-phase component of the coordinate conversion matrix shown in relational expression (1) above as 0, the coordinate conversion unit 13 causes the operation result of the U-phase voltage command value vu* to be 0. Here, the relational expression of the UVW-phase voltage command values vu*, vv*, vw*, and the d-q axis voltage command values vd*, vq* and the in-phase voltage command value vz*, is shown in Formula (2) below.

[Math 2]

$$\begin{bmatrix} V_d^* \\ V_q^* \\ V_z^* \end{bmatrix} = A \begin{bmatrix} \cos\theta & \sin\theta & 0 \\ -\sin\theta & \cos\theta & 0 \\ 0 & 0 & 1 \end{bmatrix} \begin{bmatrix} 1 & -\frac{1}{2} & -\frac{1}{2} \\ 0 & \frac{\sqrt{3}}{2} & -\frac{\sqrt{3}}{2} \\ 0 & 0 & 0 \end{bmatrix} \begin{bmatrix} V_u^* \\ V_v^* \\ V_w^* \end{bmatrix} \quad (2)$$

Furthermore, here, the coordinate conversion unit 13 adds, to the phase voltage command value of each phase that is not the energization stop phase, the in-phase voltage command value vz* corresponding to the phase voltage command value of the energization stop phase input from the current command correction unit 19, respectively. For example, when an energization stop command with the U-phase as the energization stop phase is input as described above, the current command correction unit 19 outputs the in-phase voltage command value vz* which corresponds to the U-phase voltage command value vu* during normal times. The coordinate conversion unit 13 controls the motor 200 so that a predetermined in-phase current is superimposed on the V-phase current and the W-phase current according to the original phase voltage command value and caused to flow to the V-phase winding 202 and the W-phase winding 203, respectively, by adding the in-phase voltage command value vz* to the V-phase voltage command value vv* and the W-phase voltage command value vw*, respectively.

The UVW-phase voltage command values vu*, vv*, vw* are input to the PWM signal generation unit 14 from the coordinate conversion unit 13. The PWM signal generation unit 14 generates a PWM signal based on the input UVW-phase voltage command values vu*, vv*, vw*, and outputs, to the inverter 100, the generated PWM signal as the switching signal which turns ON or turns OFF the respective switching elements of the inverter 100; that is, the switching elements 110a to 110d, 111a to 111d and 112a to 112d.

The switching signal output from the PWM signal generation unit 14 is input to the inverter 100. The inverter 100 switch-drives each of the switching elements 110a to 110d, 111a to 111d and 112a to 112d based on the input switching signal, and supplies AC power to the U-phase winding 201, the V-phase winding 202 and the W-phase winding 203 of the motor 200, respectively. The motor 200 is driven based on the foregoing operation.

The three-phase currents iu, iv, iw detected by the current sensor 220 are input to the dq conversion unit 15, and the rotor position θ detected by the position sensor 210 is also input to the dq conversion unit 15. The dq conversion unit 15 outputs the d-q axis current detection values id, iq based on the input values.

The three-phase currents iu, iv, iw detected by the current sensor 220 are input to the in-phase current calculation unit 16. The in-phase current calculation unit 16 outputs the detection value iz of the in-phase current to flow to the motor 200 based on the input three-phase currents iu, iv, iw. The in-phase current calculation unit 16 calculates the in-phase current detection value iz, for example, based on the calculation formula shown in Formula (3) below.

[Math 3]

$$i_z = \frac{i_u}{\sqrt{3}} + \frac{i_v}{\sqrt{3}} + \frac{i_w}{\sqrt{3}} \quad (3)$$

The rotor position θ detected by the position sensor 210 is input to the velocity conversion unit 18. The velocity conversion unit 18 outputs the angular velocity ω based on the input rotor position θ.

Details of the operation method of the in-phase current command value iz* by the current command correction unit 19 are now explained.

Figure 3:
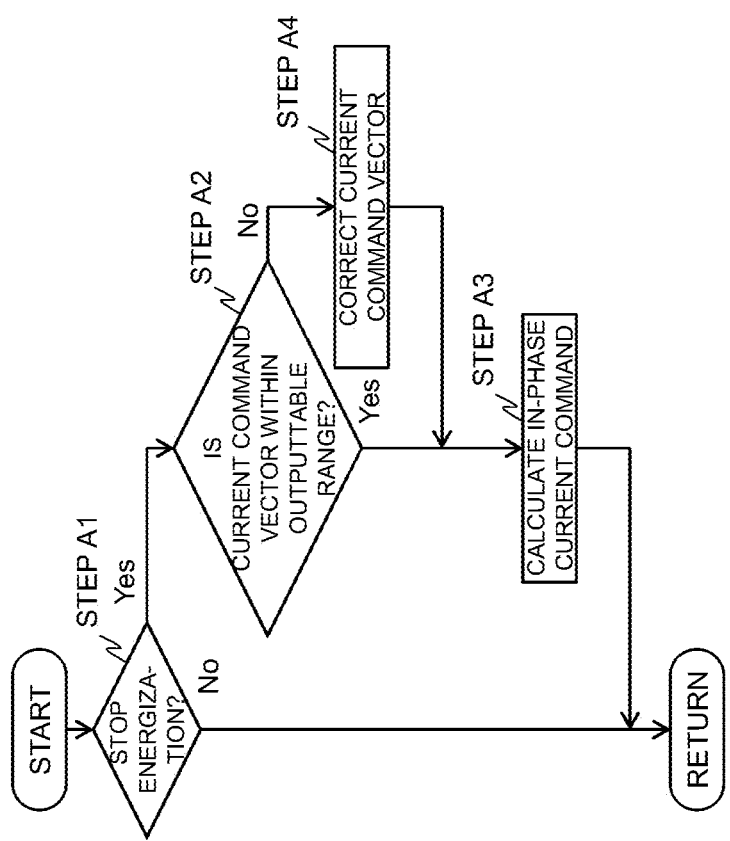
FIG. 3 is a flowchart showing the flow of the processing performed by the current command correction unit in the first embodiment of the present invention.

FIG. 3 is a flowchart showing the flow of the processing performed by the current command correction unit 19 in the first embodiment of the present invention. In this embodiment, the current command correction unit 19 executes the flowchart of FIG. 3 for each predetermined processing cycle.

In step A1, the current command correction unit 19 determines whether an energization stop command has been input. The current command correction unit 19 proceeds to step A2 if an energization stop command has been input, and ends the processing of FIG. 3 if an energization stop command has not been input.

In step A2, the current command correction unit 19 determines whether the current command vector corresponding to the d-q axis current command values id*, iq* input from the current command operation unit 11 is within a predetermined outputtable range. Consequently, the current command correction unit 19 proceeds to step A3 if the current command vector is within the outputtable range, and, in step A3, operates the in-phase current command value iz* based on the d-q axis current command values id*, iq* and the rotor position θ. Here, as described above, the current command correction unit 19 operates the in-phase current command value iz* corresponding to the current command of the energization stop phase. Specifically, for example, the current command correction unit 19 converts the d-q axis current command values id*, iq* into the three-phase current command values iu*, iv*, iw* by using the rotor position θ, and obtains the in-phase current command value iz* from the phase current command value corresponding to the energization stop phase. In other words, for example, when the energization stop phase is a U-phase, the current command correction unit 19 decomposes the vector of the U-phase current command value iu* into a V-phase component and a W-phase component, and sets the value of the obtained phase components as the in-phase current command value iz*. The current command correction unit 19 ends the processing of FIG. 3 after operating the in-phase current command value iz* in step A3.

Meanwhile, the current command correction unit 19 proceeds to step A4 when it is determined in step A2 that the current command vector is outside the outputtable range, and corrects the foregoing current command vector in step A4. Here, for example, the current command vector is corrected based on the method explained below.

Figure 4:
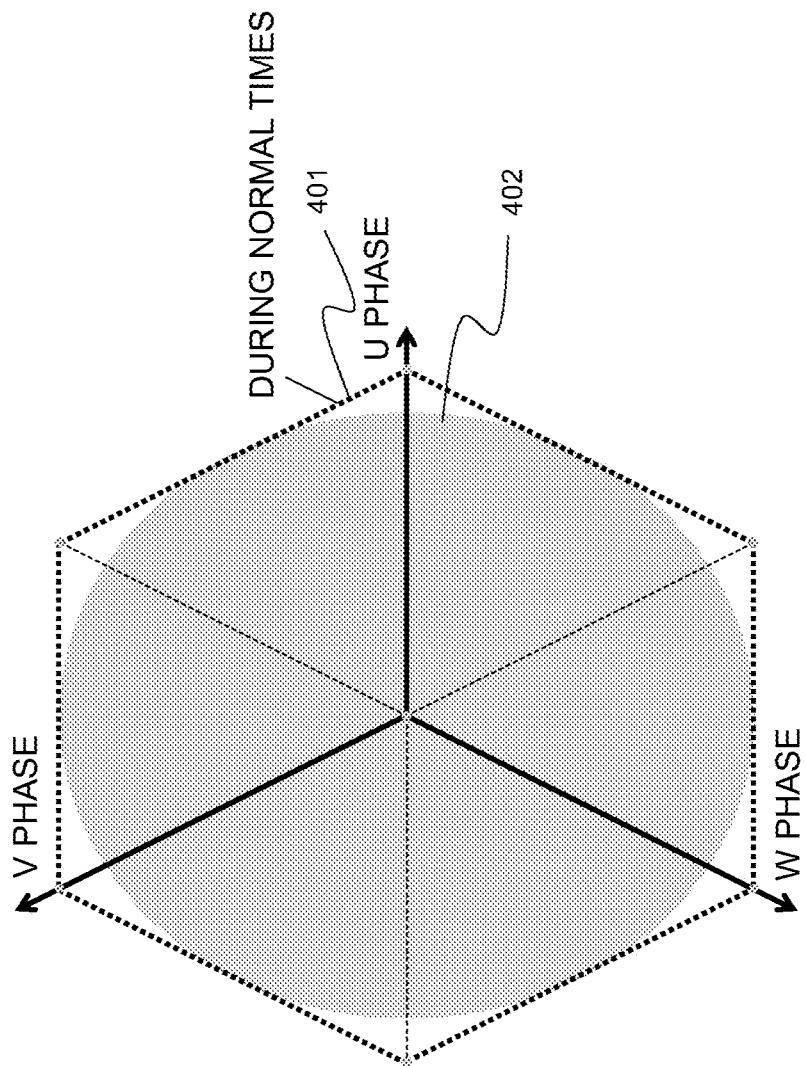
FIG. 4 is a vector diagram showing the range of the current command generated by the current command operation unit.

FIG. 4 is a vector diagram showing the range of the current command generated by the current command operation unit 11; that is, the three-phase current command values corresponding to the d-q axis current command values id*, iq*. During normal times when the inverter 100 and the motor 200 are operating normally, the windings of all phases of the motor 200; that is, the U-phase winding 201, the V-phase winding 202 and the W-phase winding 203, are being energized. Thus, the inverter 100 can output a current to each phase of the motor 200 within the range 401 shown with the dotted line in FIG. 4, and the current command operation unit 11 can output the d-q axis current command values id*, iq* which correspond to the three-phase current command values within the range 401. However, the range in which a smooth rotating magnetic field can be generated in the motor 200 is limited to the area of the inscribed circle 402 within the range 401.

Figure 5:
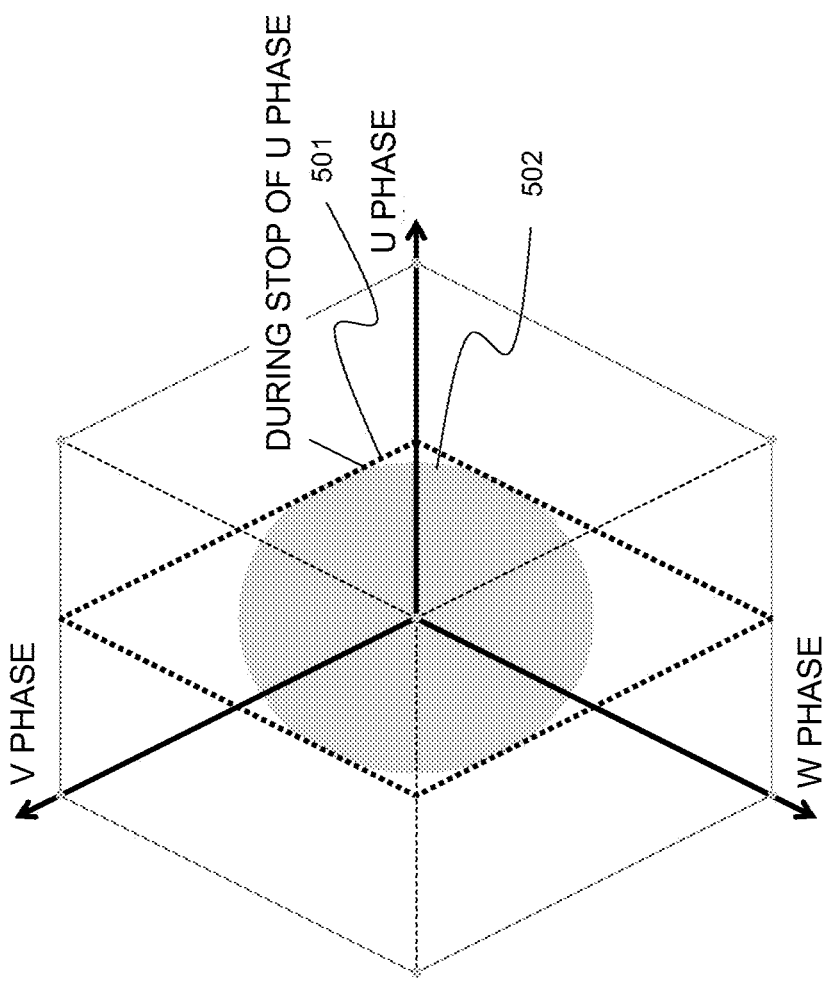
FIG. 5 is a vector diagram showing the range of the current command generated by the current command correction unit.

FIG. 5 is a vector diagram showing the range of the current command generated by the current command correction unit 19 when the energization stop command is input; that is, a vector diagram showing the range of the current command corresponding to the d-q axis current command values id*, iq* and the in-phase current command value iz*. A case of stopping the energization of the U-phase is now explained. In the foregoing case, since the energization of the U-phase is stopped unlike during the normal times explained in FIG. 4, the current of the U-phase will constantly be zero. Thus, the range corresponding to the current command that can be output from the inverter 100 to the motor 200 by using a V-phase and a W-phase is limited to the range 501 shown with the dotted line of FIG. 5 which is smaller than the range 401 shown in FIG. 4. Note that the range 401 of FIG. 4 corresponds to the outputtable range of the current command vector used in the determination of step A2 described above. Moreover, the range that a smooth rotating magnetic field can be generated is limited to the area of the inscribed circle 502 within the range 501.

In step A2 of FIG. 3, as described above, the current command correction unit 19 determines whether the vector of the three-phase current command values iu*, iv*, iw*, which are obtained by converting the d-q axis current command values id*, iq* by using the rotor position θ, falls within the range 501 of FIG. 5. Consequently, if the vector is not within the range 501, the current command correction unit 19 corrects, in step A4, the length of the vector so that the foregoing vector falls within the range 501. Subsequently, the current command correction unit 19 corrects the d-q axis current command values id*, iq* according to the corrected vector length, and outputs the corrected d-q axis current command values id*, iq* to the d-q axis current control unit 12.

The current command correction unit 19 proceeds to step A3 after correcting the d-q axis current command values id*, iq* in step A4, and operates the in-phase current command value iz* using the corrected d-q axis current command values id*, iq* as described above. The current command correction unit 19 thereafter ends the processing of FIG. 3.

Note that the range 501 of FIG. 5 overlaps with the range 401 in a specific phase corresponding to the vertex of the upper and lower ends. Thus, in this phase, even when the energization of the U-phase is stopped by properly correcting the current command, the motor 200 can output a maximum torque which is equivalent to the maximum torque during normal times as a result of a current vector of the same size as during normal times being output to the motor 200. Meanwhile, since the size of the current vector is limited in the other phases, the output torque of the motor 200 will decrease in comparison to the output torque during normal times. Thus, if the current command is output using the entire area of the range 501, there is a problem in that the torque ripple will increase in the motor 200.

Thus, with the motor control device 10 of this embodiment, when generating the in-phase current command value iz* with the current command correction unit 19, the current command vector may be limited to fall within the range 501, and thereafter further smoothed with a lowpass filter. Consequently, while it is possible to output a maximum torque which is equivalent to the maximum torque during normal times even when the energization of the U-phase, which is the energization stop phase, is stopped during a low-speed rotation of the motor 200 on the one hand, it is also possible to change the current waveform by limiting the fluctuation range, per unit time, of the current flowing to the V-phase winding 202 and the W-phase winding 203, which correspond to the V-phase and the W-phase other than the energization stop phase, during a high-speed rotation when the rotating speed of the motor 200 becomes equal to or higher than a predetermined value. Consequently, it is possible to generate a smooth rotating magnetic field in the motor 200, and realize the reduction of the torque ripple. Here, the area of the current command vector will be, for example, the inscribed circle 502. Note that the cutoff frequency of the lowpass filter can be set in advance according to the size of the tolerable torque ripple or the responsive frequency of the d-q axis current control unit 12.

Figure 6:
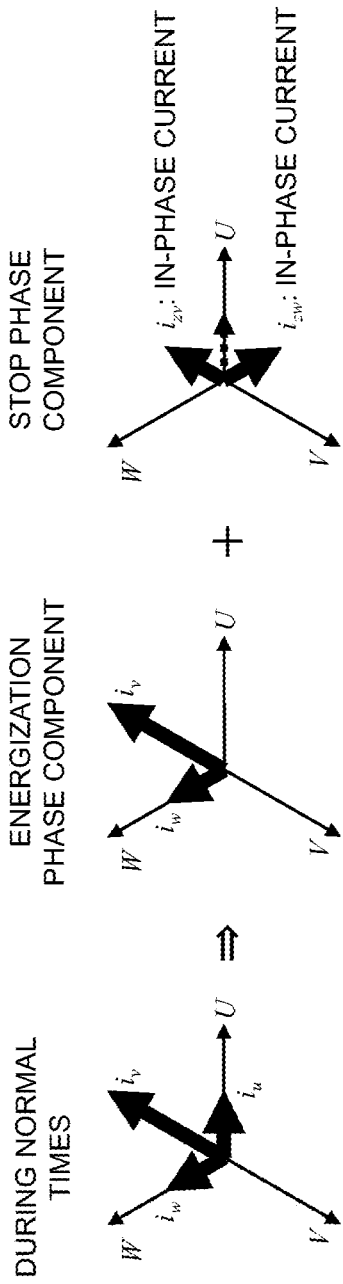
FIG. 6 is a diagram showing the generation principle of the in-phase current command value in the first embodiment of the present invention.

FIG. 6 is a diagram showing the generation principle of the in-phase current command value iz* in the first embodiment of the present invention. As described above, when there is a phase in which the energization has been stopped based on an energization stop command, it is necessary to properly correct the current command by causing the current command correction unit 19 to generate the in-phase current command value iz* corresponding to the current command of the energization stop phase, and add the thus determined in-phase voltage command value vz* to the voltage command value of another phase in the coordinate conversion unit 13. FIG. 6 shows an example of the current vector diagram when the energization of the U-phase is stopped. FIG. 6 shows that the current vector, which was being output as the U-phase current iu during normal times, is equivalently output by superimposing the in-phase currents izv, izw on the V-phase and the W-phase, respectively. Accordingly, it can be understood that the U-phase current iu can be equivalently output even when the voltage command value vu* of the V-phase is set to be 0 by generating the in-phase current command value iz* corresponding to the in-phase currents izv, izw in the current command correction unit 19, and adding the in-phase voltage command value vz* based thereon to the voltage command values vv*, vw* of the V-phase and the W-phase in the coordinate conversion unit 13, respectively.

Figure 7:
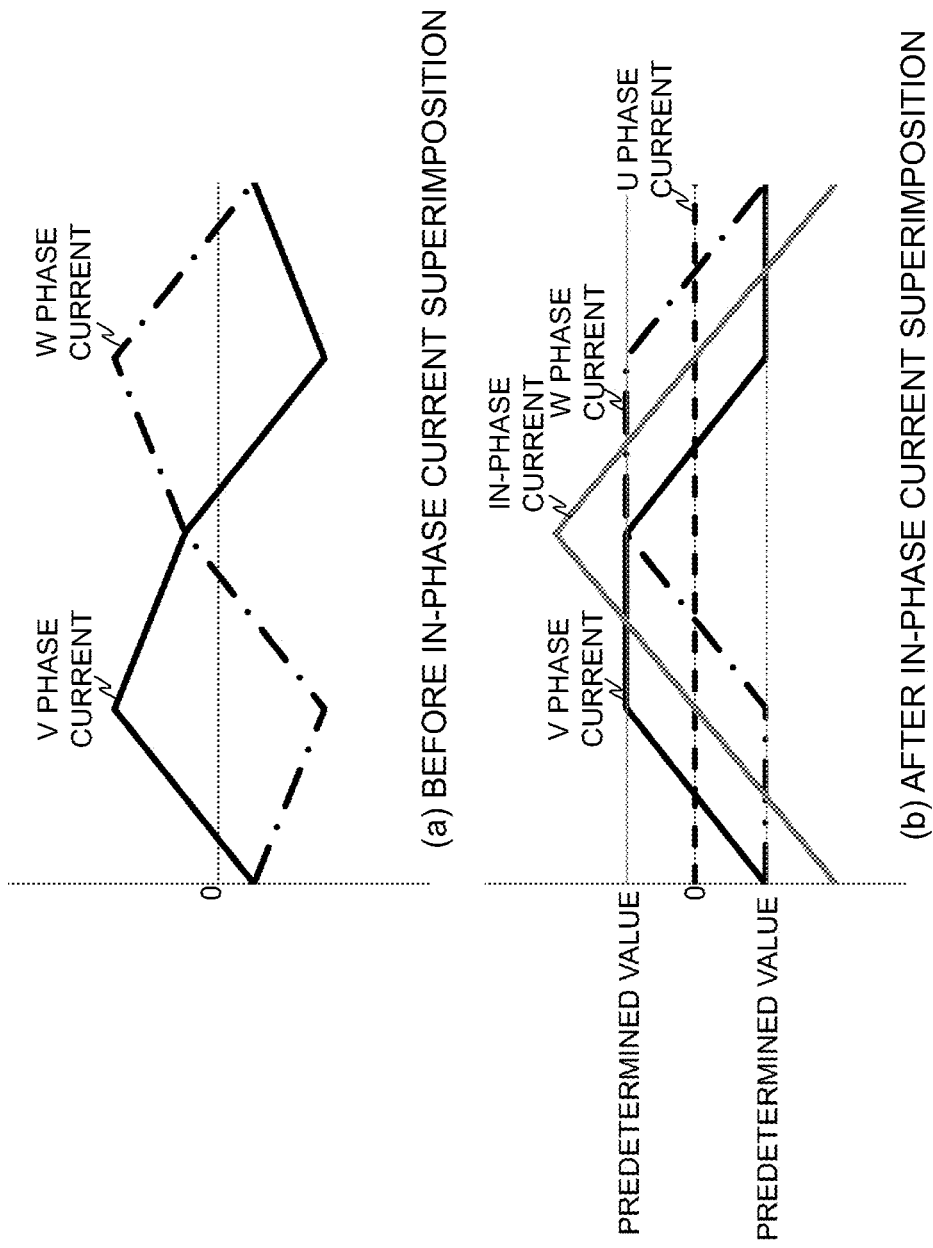
FIG. 7 is a diagram showing an example of the state of change of the motor current waveform before and after the in-phase current superimposition when the U-phase energization is stopped.

FIG. 7 is a diagram showing an example of the state of change of the motor current waveform before and after the in-phase current superimposition when the U-phase energization is stopped. Note that, in anticipation of a low-speed rotation of the motor 200, FIG. 7 shows a current waveform of each phase when the current vector is output along the range 501 shown with the dotted line in FIG. 5. FIG. 7(a) shows a waveform example of the V-phase current and the W-phase current before the superimposition of the in-phase current. When the in-phase current based on the in-phase current command value iz* corresponding to the U-phase current command value iu* is superimposed on each of these current waveforms based on the principle explained in FIG. 6, the current waveform shown in FIG. 7(b) is obtained. In FIG. 7(b), it can be understood that, based on the superimposition of the triangular-wave in-phase current, the current waveforms of the V-phase current and the W-phase current have both transformed into a trapezoidal shape.

Note that, during a high-speed rotation of the motor 200, the harmonic components of the current command may be eliminated with a lowpass filter within the current command correction unit 19 as described above. In the foregoing case, the currents respectively flowing to the V-phase and the W-phase will be closer to a sine wave in comparison to the times during a low-speed rotation.

According to the first embodiment of the present invention explained above, the following operation and effect are yielded.

(1) A motor control device 10 controls a motor 200 which has a U-phase winding 201, a V-phase winding 202 and a W-phase winding 203, which are electrically independent from each other in correspondence with a U-phase, a V-phase, and a W-phase, respectively. The motor control device 10 controls the motor 200 so that a phase current based on a torque command value T*, which is an input command value, is caused to flow to at least one among the U-phase winding 201, the V-phase winding 202, and the W-phase winding 203, and so that a predetermined in-phase current is superimposed on the phase current and caused to flow to at least one among the U-phase winding 201, the V-phase winding 202, and the W-phase winding 203. In other words, the motor control device 10 controls the motor 200 so that energization to one winding among the U-phase winding 201, the V-phase winding 202, and the W-phase winding 203 corresponding to a predetermined energization stop phase is stopped, for example, so that energization to the U-phase winding 201 is stopped, and so that a V-phase current, a W-phase current and an in-phase current are caused to flow to each winding corresponding to a phase other than the energization stop phase, for example, so that the V-phase current, the W-phase current and the in-phase current are caused to flow to the V-phase winding 202 and the W-phase winding 203. As a result of adopting the foregoing configuration, it is possible to continuously drive the motor 200, while suppressing the decrease of the output torque, when the energization of a predetermined phase is stopped in the motor 200. Accordingly, it is possible to control the motor 200, which has mutually independent windings, in a user-friendly manner.

(2) The motor control device 10 can change the current waveform in each winding corresponding to a phase other than the energization stop phase according to a rotating speed of the motor 200. Specifically, the current waveform may also be changed by using a lowpass filter in a current command correction unit 19 to limit a fluctuation range, per unit time, of the current flowing to each winding corresponding to a phase other than the energization stop phase when the rotating speed of the motor 200 is equal to or higher than a predetermined value. As a result of adopting the foregoing configuration, it is possible to generate a smooth rotating magnetic field in the motor 200, and thereby realize the reduction of the torque ripple, even when the energization of a predetermined phase is stopped in the motor 200.

(3) As shown in FIG. 7(b), when the U-phase is set as the energization stop phase, the current waveforms of the V-phase current and the W-phase current with the in-phase current superimposed thereon, respectively, are of a trapezoidal shape. It is thereby possible to equivalently output the U-phase current iu even when the voltage command value vu* of the U-phase, which is an energization stop phase, is 0.

(4) The motor control device 10 determines the in-phase current based on the torque command value T*, which is an input command value. Specifically, an inverter 100 which has switching elements 110a to 110d, 111a to 111d, and 112a to 112d and switch-drives each of these switching elements to supply AC power to the U-phase winding 201, the V-phase winding 202, and the W-phase winding 203, is connected to the motor 200. Moreover, a current sensor 220 for detecting three-phase currents iu, iv, iw flowing to the U-phase winding 201, the V-phase winding 202, and the W-phase winding 203, respectively, is disposed between the inverter 100 and the motor 200. The motor control device 10 comprises a current command operation unit 11, a d-q axis current control unit 12, a coordinate conversion unit 13, a PWM signal generation unit 14, a current command correction unit 19, an in-phase current calculation unit 16, and an in-phase current control unit 17. The current command operation unit 11 operates a d-axis current command value id* and a q-axis current command value iq* based on a torque command value T*, which is an input command value. The d-q axis current control unit 12 operates a d-axis voltage command value vd* and a q-axis voltage command value vq* based on the d-axis current command value id* and the q-axis current command value iq*. The coordinate conversion unit 13 operates UVW-phase voltage command values vu*, vv*, vw*, respectively, to the U-phase, the V-phase, and the W-phase based on the d-axis voltage command value vd* and the q-axis voltage command value vq*. The PWM signal generation unit 14 generates a switching signal based on the UVW-phase voltage command values vu*, vv*, vw* and outputs the generated switching signal to the inverter 100. The current command correction unit 19 operates an in-phase current command value iz* corresponding to a current command of the energization stop phase based on the d-axis current command value vd* and the q-axis current command value vq*. The in-phase current calculation unit 16 calculates a detection value iz of the in-phase current based on detection values of the three-phase currents iu, iv, iw detected by the current sensor 220. The in-phase current control unit 17 operates an in-phase voltage command value vz* based on the in-phase current command value iz* and the in-phase current detection value iz. In the motor control device 10, when stopping the energization to the winding corresponding to the energization stop phase, as explained in FIG. 6, the coordinate conversion unit 13 sets the phase voltage command value of the energization stop phase to 0, and adds the in-phase voltage command value iz* to the phase voltage command value of the other phase and outputs a result thereof to the PWM signal generation unit 14. As a result of adopting the foregoing configuration, the foregoing control of the motor 200 can be reliably realized in the motor control device 10.

(5) The current command correction unit 19 determines whether a current command vector according to the d-axis current command value vd* and the q-axis current command value vq* is within a predetermined outputtable range (step A2), and, upon determining that the current command vector is not within the outputtable range (step A2: No), corrects the d-axis current command value vd* and the q-axis current command value vq* (step A4). As a result of adopting the foregoing configuration, when any one of the UVW-phases is set to be the energization stop phase, the inverter 100 can superimpose the in-phase current to a phase other than the energization stop phase within the scope of currents that can actually be output to the motor 200.

Second Embodiment

As the second embodiment of the present invention, a generation method of the switching signal that differs from the first embodiment is now explained. Note that, since the functional block diagram of the motor control device 10 according to this embodiment is the same as the functional block diagram of the motor control device 10 according to the first embodiment explained with reference to FIG. 2, the illustration and explanation thereof are omitted.

Figure 8:
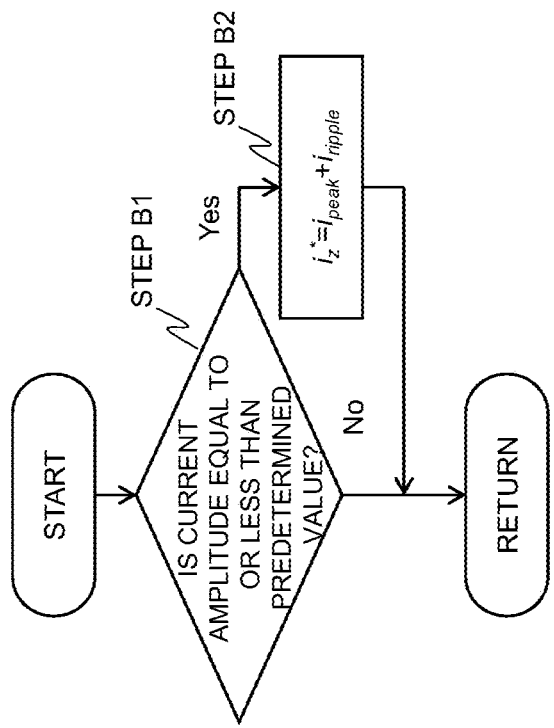
FIG. 8 is a flowchart showing the flow of the processing performed by the current command correction unit in the second embodiment of the present invention.

FIG. 8 is a flowchart showing the flow of the processing performed by the current command correction unit 19 in the second embodiment of the present invention. The current command correction unit 19 in this embodiment executes the flowchart of FIG. 8 for each predetermined processing cycle.

In step B1, the current command correction unit 19 determines whether an amplitude of the current command is equal to or less than a predetermined value based on the d-q axis current command values id*, iq* which were input from the current command operation unit 11 based on the torque command value T*, which is an input command value. Here, the predetermined value refers to a range in which the determination of the current polarity is difficult, and the size thereof is determined based on the performance of the current sensor 220, or the size of the current ripple caused by the PWM pulse output as a switching signal from the PWM signal generation unit 14. The current command correction unit 19 proceeds to step B2 when the current command amplitude is equal to or less than the predetermined value, and ends the processing of FIG. 8 when the current command amplitude is greater than the predetermined value.

In step B2, the current command correction unit 19 operates the in-phase current command value iz*. The calculation formula of the in-phase current command value iz* in the foregoing case is shown in Formula (4) below. In Formula (4), i-peak represents the amplitude of the current command in each of the UVW phases, and i-ripple represents the size of the current ripple. Note that the amplitude i-peak of the current command can be calculated by the current command correction unit 19 based on the d-q axis current command values id*, iq*. Specifically, for example, the amplitude i-peak of the current command can be calculated by converting the d-q axis current command values id*, iq* into the three-phase current command values iu*, iv*, iw* by using the rotor position θ, selecting an arbitrary three-phase current command value among the three-phase current command values iu*, iv*, iw*, ant obtaining the amplitude of the selected current command value. Here, while the three-phase current command values iu*, iv*, iw* have a common amplitude, the phases are mutually different.

[Math 4]

$$i_z^* = i_{peak} + i_{ripple} \quad (4)$$

Figure 9:
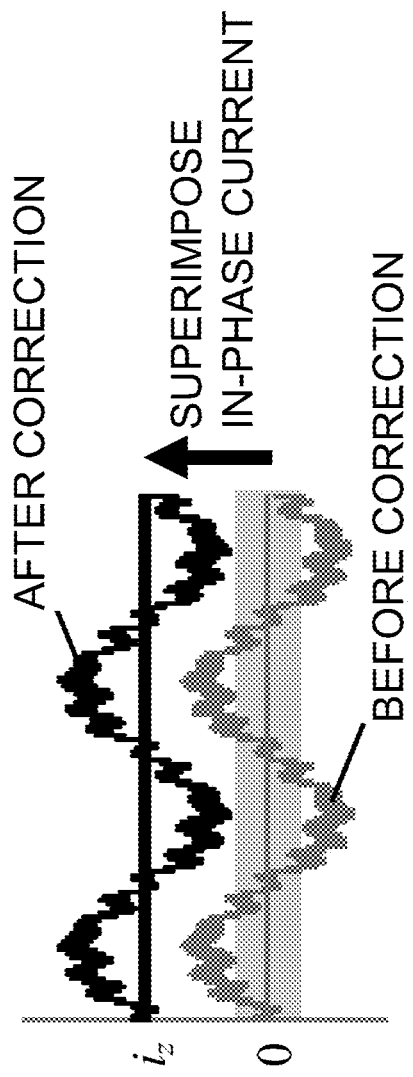
FIG. 9 is a diagram showing an example of the motor current waveform when the in-phase voltage command value is superimposed on each of the UVW-phase voltage command values.

FIG. 9 is a diagram showing an example of the motor current waveform when the in-phase voltage command value vz* is superimposed on each of the UVW-phase voltage command values vu*, vv*, vw* based on the in-phase current command value iz* obtained in step B2 of FIG. 8. Since the polarity of each phase current can constantly be positive as shown in FIG. 9 by respectively superimposing the DC in-phase current according to the in-phase current command value iz*, which was generated based on Formula (4) above, on the current of each phase, it is possible to suppress the current flowing to the motor 200 from becoming a size in which the determination of polarity is difficult. It is thereby possible to reduce the erroneous determination of the current polarity, and more accurately compensate the dead time error in the inverter 100. Accordingly, the output voltage error is reduced, and improvement of the current control performance and reduction of the torque ripple can be realized. Note that, while FIG. 9 illustrated a case where the polarity of each phase current is constantly positive, the same effect can be obtained even when the in-phase current is superimposed so that the polarity of each phase current is contrarily negative at all times.

According to the second embodiment of the present invention explained above, the following operation and effect are yielded.

(1) A motor control device 10 controls a motor 200 which has a U-phase winding 201, a V-phase winding 202 and a W-phase winding 203, which are electrically independent from each other in correspondence with a U-phase, a V-phase, and a W-phase, respectively. The motor control device 10 controls the motor 200 so that a phase current based on a torque command value T*, which is an input command value, is caused to flow to at least one among the U-phase winding 201, the V-phase winding 202, and the W-phase winding 203, and so that a predetermined in-phase current is superimposed on the phase current and caused to flow to at least one among the U-phase winding 201, the V-phase winding 202, and the W-phase winding 203. In other words, when the amplitude of the current command based on the torque command value T*, which is an input command value, is equal to or less than a predetermined value (step B1: Yes), the motor control device 10 controls the motor 200 so that the respective phase currents of the U-phase current, the V-phase current, and the W-phase current, and the in-phase current, will flow to the U-phase winding 201, the V-phase winding 202, and the W-phase winding 203, respectively (step B2). As a result of adopting the foregoing configuration, the output voltage error to the motor 200 is reduced, and improvement of the current control performance and reduction of the torque ripple can be realized. Accordingly, it is possible to control the motor 200, which has mutually independent windings, in a user-friendly manner.

(2) As shown in FIG. 9, the polarity of each phase current with the in-phase current superimposed thereon is constantly positive or negative. It is thereby possible to suppress the current flowing to the motor 200 from becoming a size in which the determination of polarity is difficult, and reduce the erroneous determination of the current polarity.

(3) The motor control device 10 determines the in-phase current based on the current command amplitude and a predetermined current ripple by using Formula (4) described above. It is thereby possible to reliably suppress the current flowing to the motor 200 from becoming a size in which the determination of polarity is difficult.

(4) An inverter 100 which has switching elements 110a to 110d, 111a to 111d, and 112a to 112d and switch-drives each of these switching elements to supply AC power to the U-phase winding 201, the V-phase winding 202, and the W-phase winding 203, is connected to the motor 200. Moreover, a current sensor 220 for detecting three-phase currents iu, iv, iw flowing to the U-phase winding 201, the V-phase winding 202, and the W-phase winding 203, respectively, is disposed between the inverter 100 and the motor 200. The motor control device 10 comprises a current command operation unit 11, a d-q axis current control unit 12, a coordinate conversion unit 13, a PWM signal generation unit 14, a current command correction unit 19, an in-phase current calculation unit 16, and an in-phase current control unit 17. The current command operation unit 11 operates a d-axis current command value id* and a q-axis current command value iq* based on the torque command value T*, which is an input command value. The d-q axis current control unit 12 operates a d-axis voltage command value vd* and a q-axis voltage command value vq* based on the d-axis current command value id* and the q-axis current command value iq*. The coordinate conversion unit 13 operates UVW-phase voltage command values vu*, vv*, vw*, respectively, to the U-phase, the V-phase, and the W-phase based on the d-axis voltage command value vd* and the q-axis voltage command value vq*. The PWM signal generation unit 14 generates a switching signal based on the UVW-phase voltage command values vu*, vv*, vw* and outputs the generated switching signal to the inverter 100. The current command correction unit 19 calculates an amplitude i-peak of a current command based on the d-axis current command value vd* and the q-axis current command value vq*, and operates an in-phase current command value iz* according to the amplitude i-peak of the current command. The in-phase current calculation unit 16 calculates a detection value iz of the in-phase current based on detection values of the three-phase currents iu, iv, iw detected by the current sensor 220. The in-phase current control unit 17 operates an in-phase voltage command value vz* based on the in-phase current command value iz* and the in-phase current detection value iz. In the motor control device 10, when the amplitude i-peak of the current command is equal to or less than a predetermined value, the coordinate conversion unit 13 adds the in-phase voltage command value vz* to each of the phase voltage command values vu*, vv*, vw* of the UVW-phases and outputs a result thereof to the PWM signal generation unit 14. As a result of adopting the foregoing configuration, the foregoing control of the motor 200 can be reliably realized in the motor control device 10.

Third Embodiment

Figure 10:
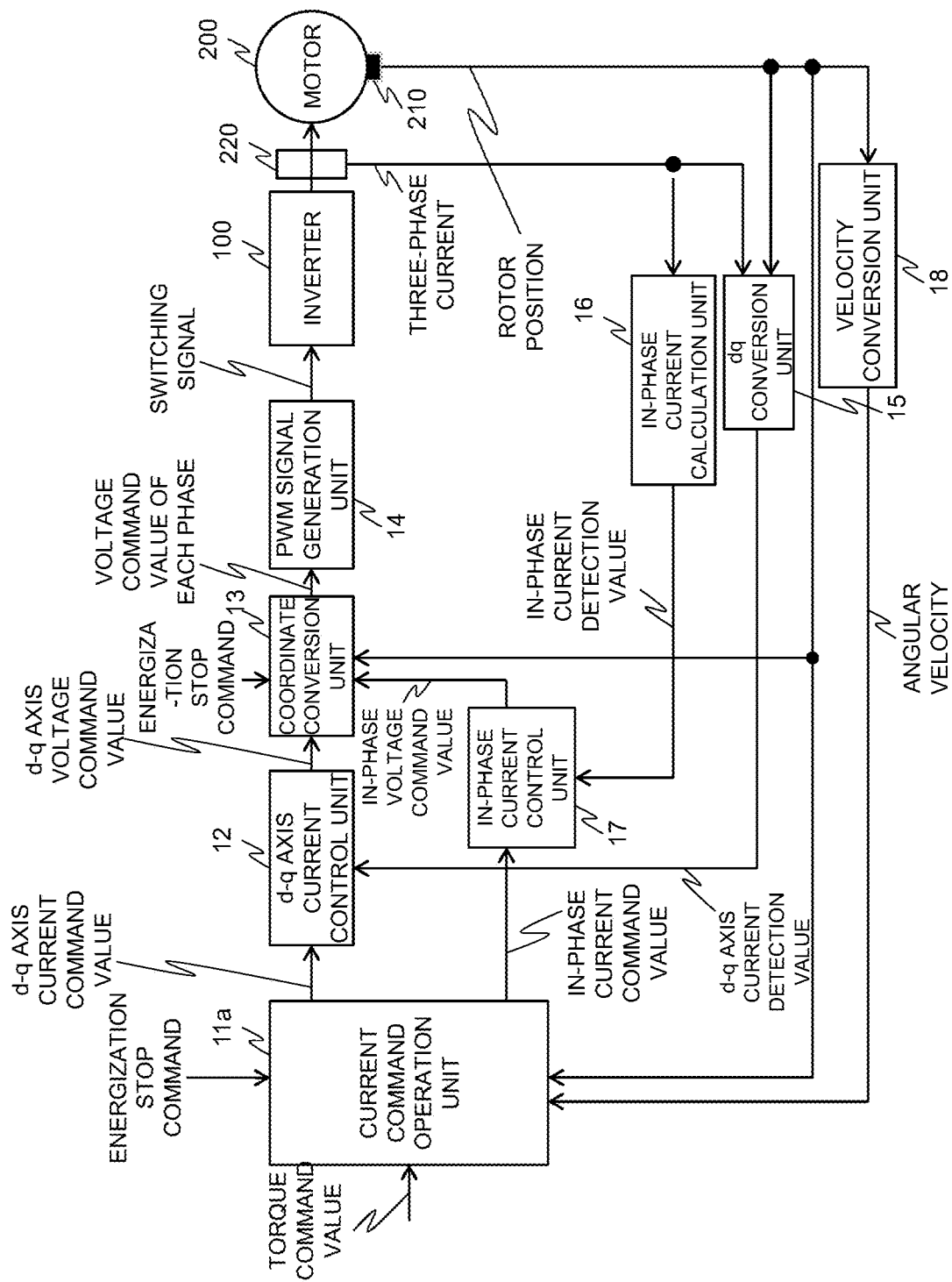
FIG. 10 is a functional block diagram of the motor control device according to the third embodiment of the present invention.

As the third embodiment of the present invention, a configuration of the motor control device 10 that differs from the first and second embodiments is now explained. FIG. 10 is a functional block diagram of the motor control device 10 according to the third embodiment of the present invention.

In FIG. 10, the different points in comparison to the functional block diagram of FIG. 2 explained in the first embodiment is that a current command operation unit 11a is provided in substitute for the current command operation unit 11, and that the current command correction unit 19 is not provided. The current command operation unit 11a is further equipped with the function of the current command correction unit 19 in addition to the function of the current command operation unit 11. In other words, the current command operation unit 11a operates the d-q axis current command values id*, iq* based on the torque command value T* input to the motor control device 10 from the outside, and the angular velocity ω of the motor 200 output from the velocity conversion unit 18 based on the rotor position θ of the motor 200 detected by the position sensor 210, and outputs the operated d-q axis current command values id*, iq* to the d-q axis current control unit 12. Moreover, when an energization stop command of the motor 200 is input to the motor control device 10 from the outside, the current command operation unit 11a operates the in-phase current command value iz* to the in-phase current of the motor 200 based on the d-q axis current command values id*, iq* and the rotor position θ, and outputs the operated in-phase current command value iz* to the in-phase current control unit 17. Here, the current command operation unit 11a can operate the in-phase current command value iz*, for example, by using the current command table data that was pre-set based on the principle explained in FIG. 6.

According to the third embodiment of the present invention explained above, the same operation and effect as the operation and effect explained in the first embodiment can be yielded.

Note that, while the foregoing third embodiment explained a case where the current command operation unit 11a has the function of the current command correction unit 19 explained in the first embodiment, the current command operation unit 11a may alternately have the function of the current command correction unit 19 explained in the second embodiment. Furthermore, the current command operation unit 11a may have both of the functions of the current command correction unit 19 explained respectively in the first and second embodiments.

Fourth Embodiment

The fourth embodiment of the present invention is now explained with reference to FIG. 11. However, explanation of the points that are the same as the first embodiment will be omitted.

Figure 11:
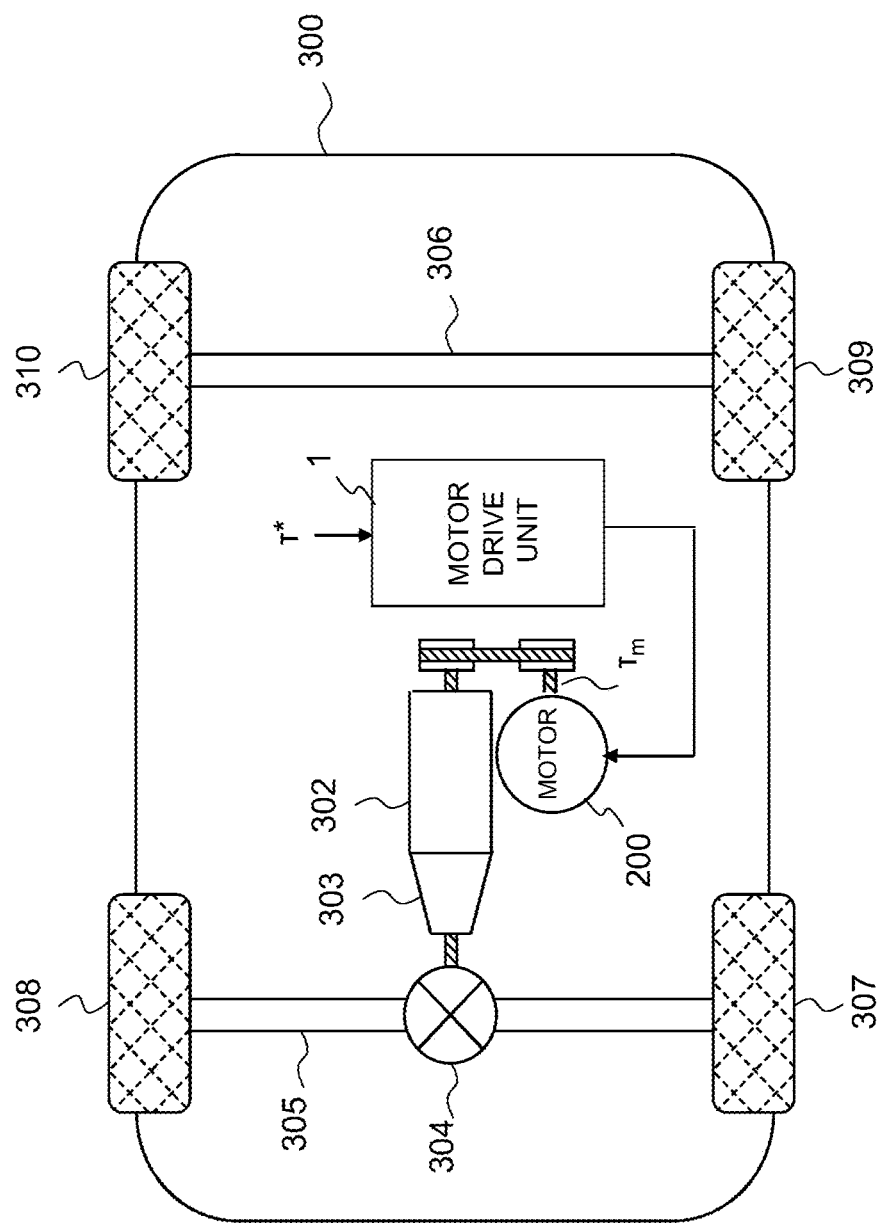
FIG. 11 is a configuration diagram of the electric vehicle equipped with the motor drive unit according to the fourth embodiment of the present invention.

FIG. 11 is a configuration diagram of the electric vehicle according to the fourth embodiment of the present invention equipped with the motor drive unit 1. The electric vehicle 300 shown in FIG. 11 is equipped with the motor 200 and the motor drive unit 1 explained in the first embodiment, and is driven by the motor 200 as the drive source. In other words, the motor 200 of this embodiment generates the torque required for driving the electric vehicle 300 by being driven by the inverter 100 equipped in the motor drive unit 1.

A drive wheel axle 305 and a driven wheel axle 306 are pivotally supported in the electric vehicle 300 of this embodiment. Drive wheels 307, 308 are provided to either end of the drive wheel axle 305, and driven wheels 309, 310 are provided to either end of the driven wheel axle 306. Note that the drive wheels 307, 308 and the driven wheels 309, 310 may respectively be either the front wheels or the rear wheels of the electric vehicle 300. Moreover, both the front wheels and the rear wheels may be the drive wheels.

The drive wheel axle 305 comprises a differential gear 304, which is a power transfer mechanism. The differential gear 304 transmits, to the drive wheel axle 305, the rotative power transmitted from an engine 302 via a transmission 303. The engine 302 and the motor 200 are mechanically connected, and the rotative power of the motor 200 is transmitted to the engine 302, and the rotative power of the engine 302 is transmitted to the motor 200, respectively.

The motor drive unit 1 drives the motor 200 so that the output torque Tm of the motor 200 follows the torque command value T*, according to the method explained in the first embodiment, based on the torque command value T* input from a higher-level controller (not shown). As a result of being driven by the motor drive unit 1, the motor 200 outputs the output torque Tm to the drive wheel axle 305 via the engine 302 and the transmission 303, and thereby causes the electric vehicle 300 to run. Moreover, as a result of the rotor being rotated based on the rotative power of the engine 302, the rotor generates three-phase AC power. In other words, while the motor 200 operates as an electric motor on the one hand, the motor 200 also operates as a generator on the other hand.

According to the fourth embodiment of the present invention explained above, the electric vehicle 300 comprises the motor drive unit 1 including the motor control device 10, and a motor 200 controlled by the motor control device 10. As a result of adopting the foregoing configuration, the control of the motor 200 can be properly performed by using the motor control device 10 upon running the electric vehicle 300.

While the foregoing fourth embodiment explained a case where the electric vehicle 300 is a hybrid car, the same effect can be yielded when the electric vehicle 300 is a plug-in hybrid car or an electric car. Moreover, while the foregoing fourth embodiment explained a case where the electric vehicle 300 is equipped with one motor 200, the electric vehicle 300 may also be equipped with two or more motors 200.

The respective embodiments and various modified examples explained above may also be arbitrarily combined. Moreover, while various embodiments and modified examples were explained above, the present invention is not limited to the subject matter thereof. Other modes that are considered to fall within the technical scope of the present invention also fall within the scope of the present invention.

REFERENCE SIGNS LIST

1 . . . motor drive unit
10 . . . motor control device

11 . . . current command operation unit
12 . . . d-q axis current control unit
13 . . . coordinate conversion unit
14 . . . PWM signal generation unit
15 . . . dq conversion unit
16 . . . in-phase current calculation unit
17 . . . in-phase current control unit
18 . . . velocity conversion unit
19 . . . current command correction unit
100 . . . inverter
110 . . . U-phase full bridge inverter
110a, 110b, 110c, 110d . . . switching element
111 . . . V-phase full bridge inverter
111a, 111b, 111c, 111d . . . switching element
112 . . . W-phase full bridge inverter
112a, 112b, 112c, 112d . . . switching element
200 . . . motor
201 . . . U-phase winding
202 . . . V-phase winding
203 . . . W-phase winding
210 . . . position sensor
220 . . . current sensor
230 . . . switch
300 . . . electric vehicle
302 . . . engine
303 . . . transmission
304 . . . differential gear
305 . . . drive wheel axle
306 . . . driven wheel axle
307, 308 . . . drive wheel
309, 310 . . . driven wheel

The invention claimed is:

1. A motor control device for controlling a motor which has a plurality of windings that are electrically independent from each other in correspondence with each of a plurality of phases,
wherein the motor control device controls the motor so that a phase current based on an input command value is caused to flow to at least one of the plurality of windings, and a predetermined in-phase current is superimposed on the phase current and caused to flow to at least one of the plurality of windings, and
wherein the motor control device controls the motor so that energization to one winding among the plurality of windings corresponding to a predetermined energization stop phase is stopped, and the phase current and the in-phase current are respectively caused to flow to each winding corresponding to a phase other than the energization stop phase among the plurality of phases.

2. The motor control device according to claim 1,
wherein the motor control device changes a current waveform in each winding corresponding to the other phase according to a rotating speed of the motor.

3. The motor control device according to claim 2,
wherein, when the rotating speed of the motor is equal to or greater than a predetermined value, the motor control device changes the current waveform by limiting a fluctuation range, per unit time, of the current flowing to each winding corresponding to the other phase.

4. The motor control device according to claim 1,
wherein the current waveform of the phase current with the in-phase current superimposed thereon is of a trapezoidal shape.

5. The motor control device according to claim 1,
wherein the motor control device determines the in-phase current based on the input command value.

6. The motor control device according to claim 5,
wherein an inverter which has a plurality of switching elements and switch-drives each of the plurality of switching elements to supply AC power to the plurality of windings is connected to the motor,
wherein a current sensor for detecting a phase current flowing to each of the plurality of windings is disposed between the inverter and the motor,
wherein the motor control device comprises:
a current command operation unit which operates a d-axis current command value and a q-axis current command value based on the input command value;
a d-q axis current control unit which operates a d-axis voltage command value and a q-axis voltage command value based on the d-axis current command value and the q-axis current command value;
a coordinate conversion unit which operates each phase voltage command value to the plurality of phases based on the d-axis voltage command value and the q-axis voltage command value;
a PWM signal generation unit which generates a switching signal based on the phase voltage command value and outputs the generated switching signal to the inverter;
a current command correction unit which operates an in-phase current command value, which corresponds to a current command of the energization stop phase, based on the d-axis current command value and the q-axis current command value;
an in-phase current calculation unit which calculates a detection value of the in-phase current based on a detection value of the phase current detected by the current sensor; and
an in-phase current control unit which operates an in-phase voltage command value based on the in-phase current command value and the in-phase current detection value, and
wherein, when stopping energization to the winding corresponding to the energization stop phase, the coordinate conversion unit sets the phase voltage command value of the energization stop phase to 0, and adds the in-phase voltage command value to the phase voltage command value of the other phase and outputs a result thereof to the PWM signal generation unit.

7. The motor control device according to claim 6,
wherein the current command correction unit determines whether a current command vector according to the d-axis current command value and the q-axis current command value is within a predetermined outputtable range and, upon determining that the current command vector is not within the outputtable range, corrects the d-axis current command value and the q-axis current command value.

8. The motor control device according to claim 1,
wherein, when an amplitude of a current command based on the input command value is equal to or less than a predetermined value, the motor control device controls the motor so that the phase current and the in-phase current are respectively caused to flow to each of the plurality of windings.

9. The motor control device according to claim 8,
wherein a polarity of the phase current with the in-phase current superimposed thereon is constantly positive or negative.

10. The motor control device according to claim 8,
wherein the motor control device determines the in-phase current based on the current command amplitude and a predetermined current ripple.

11. The motor control device according to claim 10,
wherein an inverter which has a plurality of switching elements and switch-drives each of the plurality of switching elements to supply AC power to the plurality of windings is connected to the motor,
wherein a current sensor for detecting a phase current flowing to each of the plurality of windings is disposed between the inverter and the motor,
wherein the motor control device comprises:
a current command operation unit which operates a d-axis current command value and a q-axis current command value based on the input command value;
a d-q axis current control unit which operates a d-axis voltage command value and a q-axis voltage command value based on the d-axis current command value and the q-axis current command value;
a coordinate conversion unit which operates each phase voltage command value to the plurality of phases based on the d-axis voltage command value and the q-axis voltage command value;
a PWM signal generation unit which generates a switching signal based on the phase voltage command value and outputs the generated switching signal to the inverter;
a current command correction unit which calculates an amplitude of the current command based on the d-axis current command value and the q-axis current command value, and operates an in-phase current command value according to the current command amplitude;
an in-phase current calculation unit which calculates a detection value of the in-phase current based on a detection value of the phase current detected by the current sensor; and
an in-phase current control unit which operates an in-phase voltage command value based on the in-phase current command value and the in-phase current detection value, and
wherein, when the current command amplitude is equal to or less than the predetermined value, the coordinate conversion unit adds the in-phase voltage command value to each phase voltage command value of the plurality of phases, and outputs a result thereof to the PWM signal generation unit.

12. An electric vehicle, comprising:
a motor control device for controlling a motor which has a plurality of windings that are electrically independent from each other in correspondence with each of a plurality of phases,
wherein the motor control device controls the motor so that a phase current based on an input command value is caused to flow to at least one of the plurality of windings, and a predetermined in-phase current is superimposed on the phase current and caused to flow to at least one of the plurality of windings, and
wherein the motor control device controls the motor so that energization to one winding among the plurality of windings corresponding to a predetermined energization stop phase is stopped, and the phase current and the in-phase current are respectively caused to flow to each winding corresponding to a phase other than the energization stop phase among the plurality of phases; and
the motor controlled by the motor control device.

13. The electric vehicle according to claim 12,
wherein the motor control device changes a current waveform in each winding corresponding to the other phase according to a rotating speed of the motor.

14. The electric vehicle according to claim 13,
wherein, when the rotating speed of the motor is equal to or greater than a predetermined value, the motor control device changes the current waveform by limiting a fluctuation range, per unit time, of the current flowing to each winding corresponding to the other phase.

15. The electric vehicle according to claim 12,
wherein the current waveform of the phase current with the in-phase current superimposed thereon is of a trapezoidal shape.

16. The electric vehicle according to claim 12,
wherein the motor control device determines the in-phase current based on the input command value.

17. The electric vehicle according to claim 16,
wherein an inverter which has a plurality of switching elements and switch-drives each of the plurality of switching elements to supply AC power to the plurality of windings is connected to the motor,
wherein a current sensor for detecting a phase current flowing to each of the plurality of windings is disposed between the inverter and the motor,
wherein the motor control device comprises:
a current command operation unit which operates a d-axis current command value and a q-axis current command value based on the input command value;
a d-q axis current control unit which operates a d-axis voltage command value and a q-axis voltage command value based on the d-axis current command value and the q-axis current command value;
a coordinate conversion unit which operates each phase voltage command value to the plurality of phases based on the d-axis voltage command value and the q-axis voltage command value;
a PWM signal generation unit which generates a switching signal based on the phase voltage command value and outputs the generated switching signal to the inverter;
a current command correction unit which operates an in-phase current command value, which corresponds to a current command of the energization stop phase, based on the d-axis current command value and the q-axis current command value;
an in-phase current calculation unit which calculates a detection value of the in-phase current based on a detection value of the phase current detected by the current sensor; and
an in-phase current control unit which operates an in-phase voltage command value based on the in-phase current command value and the in-phase current detection value, and
wherein, when stopping energization to the winding corresponding to the energization stop phase, the coordinate conversion unit sets the phase voltage command value of the energization stop phase to 0, and adds the in-phase voltage command value to the phase voltage command value of the other phase and outputs a result thereof to the PWM signal generation unit.

18. The electric vehicle according to claim 17,
wherein the current command correction unit determines whether a current command vector according to the d-axis current command value and the q-axis current command value is within a predetermined outputtable range and, upon determining that the current command vector is not within the outputtable range, corrects the d-axis current command value and the q-axis current command value.

19. The electric vehicle according to claim 12,
wherein, when an amplitude of a current command based on the input command value is equal to or less than a predetermined value, the motor control device controls the motor so that the phase current and the in-phase current are respectively caused to flow to each of the plurality of windings.

20. The electric vehicle according to claim 19,
wherein a polarity of the phase current with the in-phase current superimposed thereon is constantly positive or negative.

* * * * *